United States Patent
Shenoy et al.

(10) Patent No.: US 12,374,963 B2
(45) Date of Patent: Jul. 29, 2025

(54) TURBOEXPANDER SYSTEM WITH LOW VOLTAGE RIDE THROUGH CONTROL ARCHITECTURE

(71) Applicant: Sapphire Technologies, Inc., Cerritos, CA (US)

(72) Inventors: Suratkal P. Shenoy, Mission Viejo, CA (US); Liping Zheng, Buena Park, CA (US); Jeremy Liu, Norwalk, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 257 days.

(21) Appl. No.: 17/815,865

(22) Filed: Jul. 28, 2022

(65) Prior Publication Data

US 2024/0039369 A1 Feb. 1, 2024

(51) Int. Cl.
| | |
|---|---|
| *H02K 11/04* | (2016.01) |
| *F01D 15/10* | (2006.01) |
| *H02K 7/09* | (2006.01) |
| *H02K 7/18* | (2006.01) |
| *H02P 3/22* | (2006.01) |

(52) U.S. Cl.
CPC ............. *H02K 11/04* (2013.01); *F01D 15/10* (2013.01); *H02K 7/09* (2013.01); *H02K 7/1823* (2013.01); *H02P 3/22* (2013.01); *F05D 2220/764* (2013.01)

(58) Field of Classification Search
CPC ... F01D 15/10; F05D 2220/764; H02K 11/04; H02K 7/09; H02K 7/1823; H02P 3/22; H02P 9/00; Y02W 10/10
See application file for complete search history.

(56) References Cited

U.S. PATENT DOCUMENTS

| | | |
|---|---|---|
| 3,508,090 A | 4/1970 | Crampton et al. |
| 5,689,175 A | 11/1997 | Hanson et al. |
| 7,586,216 B2 | 9/2009 | Li et al. |
| 7,638,892 B2 | 12/2009 | Myers |
| 8,146,360 B2 | 4/2012 | Myers et al. |

(Continued)

FOREIGN PATENT DOCUMENTS

| | | |
|---|---|---|
| CN | 106044600 | 8/2018 |
| CN | 211343213 | 8/2020 |

OTHER PUBLICATIONS

International Search Report and Written Opinion in International Appln. No. PCT/US2023/028938, mailed on Oct. 16, 2023, 15 pages.

(Continued)

*Primary Examiner* — Naishadh N Desai
(74) *Attorney, Agent, or Firm* — Fish & Richardson P.C.

(57) ABSTRACT

An electric generator includes a turbine wheel configured to receive process gas and rotate in response to expansion of the process gas flowing into an inlet of the turbine wheel and out of the outlet of the turbine wheel, a rotor coupled to the turbine wheel and configured to rotate with the turbine wheel, and a stationary stator, the electric generator to generate an alternating current upon rotation of the rotor within the stator. The electric generator can supply power to a power grid. During a low voltage event, current from the electric generator can be diverted to a brake resistor assembly. The brake resistor assembly can include a brake resistor designed to allow the electric generator to operate during the low-voltage event.

17 Claims, 6 Drawing Sheets

(56) References Cited

U.S. PATENT DOCUMENTS

| | | | |
|---|---|---|---|
| 8,384,232 | B2 | 2/2013 | Myers et al. |
| 8,400,005 | B2 | 3/2013 | Huber et al. |
| 8,739,538 | B2 | 6/2014 | Myers et al. |
| 8,839,622 | B2 | 9/2014 | Myers et al. |
| 2001/0030425 | A1* | 10/2001 | Gilbreth .................. H02P 9/30 290/52 |
| 2002/0190695 | A1* | 12/2002 | Wall ....................... H02J 1/10 322/17 |
| 2005/0258795 | A1* | 11/2005 | Choi .................. B29C 45/7666 318/625 |
| 2009/0165461 | A1 | 7/2009 | Klassen et al. |
| 2012/0013125 | A1 | 1/2012 | Myers et al. |
| 2012/0187874 | A1* | 7/2012 | Fourmont ................ H02P 3/22 318/375 |
| 2013/0286591 | A1 | 10/2013 | Myers et al. |
| 2013/0300120 | A1 | 11/2013 | Podrog |
| 2016/0338225 | A1 | 11/2016 | Joshi et al. |
| 2019/0055899 | A1 | 2/2019 | Munevar et al. |
| 2019/0153952 | A1 | 5/2019 | Niergarth et al. |
| 2019/0366803 | A1 | 12/2019 | Harris |
| 2021/0156308 | A1 | 5/2021 | Jones |
| 2021/0347265 | A1* | 11/2021 | Park ...................... B60K 11/02 |
| 2022/0176965 | A1* | 6/2022 | Gesang ................ B60W 10/06 |

OTHER PUBLICATIONS

International Preliminary Report on Patentability in International Appln. No. PCT/US2023/028938, mailed on Jan. 28, 2025, 9 pages.

\* cited by examiner

TURBOEXPANDER SYSTEM WITH LOW VOLTAGE RIDE THROUGH CONTROL ARCHITECTURE

BACKGROUND

Natural gas is one of the principal sources of energy for many of our day-to-day needs and activities. Natural gas is an attractive fossil fuel for its abundance and relative cleanliness. Hydrogen is a rapidly expanding global energy storage market. Hydrogen is used in many manufacturing processes from petroleum refining to food processing. Hydrogen is also used as a fuel source for gas turbines and in a broad range of fuels cells to generate electricity in industrial and consumer transportation sectors.

The efficient and effective movement of such gases from producing regions to consumption regions requires an extensive and elaborate transportation system. Natural gas that is transported through pipelines travels at high pressure in the pipeline.

SUMMARY

Aspects of the embodiments include an apparatus that includes an electric generator. The electric generator includes a turbine wheel configured to receive process gas and rotate in response to expansion of the process gas flowing into an inlet of the turbine wheel and out of the outlet of the turbine wheel, a rotor coupled to the turbine wheel and configured to rotate with the turbine wheel, and a stationary stator, the electric generator to generate an alternating current upon rotation of the rotor within the stator. The apparatus also includes a brake resistor assembly comprising a brake resistor; a switching component to cause current originating from the electric generator to flow into the brake resistor assembly based on a detection of a low-voltage event; and a low-voltage detection circuit to detect voltage and control the switching component based on a detection of a low-voltage event.

Aspects of the embodiments include a method that includes causing gas to flow through a turbine wheel of an electric generator residing downstream of a flow control valve; generating electrical current by the electric generator based on rotation of the turbine wheel by the gas flow; directing electrical current generated by the electric generator to a power grid; detecting a low-voltage event at the power grid; and directing electrical current generated by the electric generator to a brake resistor assembly based on the detection of the low-voltage event.

Aspects of the embodiments include a system that includes an electric generator. The electric generator includes a turbine wheel configured to receive process gas and rotate in response to expansion of the process gas flowing into an inlet of the turbine wheel and out of the outlet of the turbine wheel, a rotor coupled to the turbine wheel and configured to rotate with the turbine wheel, and a stationary stator, the electric generator to generate an alternating current upon rotation of the rotor within the stator. The system includes a brake resistor assembly comprising a brake resistor; a switching component to cause current originating from the electric generator to flow into the brake resistor assembly based on a detection of a low-voltage event; a low-voltage detection circuit to detect voltage and control the switching component based on a detection of a low-voltage event; a bidirectional inverter circuit to receive alternating current (AC) from the electric generator and convert th7 to direct current (DC); and an active front end (AFE) rectifier to receive DC from the bidirectional inverter circuit and to convert the DC into AC having a frequency and amplitude compatible with a power grid.

In some embodiments, the switching component comprises a static switch to connect the brake resistor assembly to the electrical output of the electric generator upon detection of the low-voltage event and to disconnect the brake resistor assembly from the electrical output of the electric generator upon detection of the completion of the low-voltage event.

In some embodiments, the brake resistor comprises a peak kilowatt rated resistor.

In some embodiments, wherein the brake resistor assembly is co-located with the electric generator.

In some embodiments, the switching component comprising a speed-controlled, current regulated alternating current to direct current (AC/DC) rectifier, the speed-controlled, current regulated AC/DC rectifier to direct current from the electrical output of the turboexpander upon detection of the low-voltage event and to electrically isolate the brake resistor assembly when the low-voltage event is complete.

In some embodiments, the brake resistor comprises a continuous-rated brake resistor.

In some embodiments, the switching component comprises an AC isolation contactor to electrically isolate the brake resistor assembly from the electrical output of the electric generator.

In some embodiments, a power electronics includes a bidirectional inverter circuit to receive alternating current (AC) from the electrical output of the electric generator and convert the AC to direct current (DC); and an active front end (AFE) rectifier to receive DC on a DC bus from the bidirectional inverter circuit and to convert the DC into AC having a frequency and amplitude compatible with a power grid.

In some embodiments, the power electronics comprises the switching component and the brake resistor assembly, the switching component connected to an output of the bidirectional inverter circuit on the DC bus.

In some embodiments, the bidirectional inverter circuit comprises a speed-controlled, current regulated alternating current to direct current (AC/DC) rectifier to direct current to the brake resistor assembly upon detection of the low-voltage event and to direct current to the AFE rectifier after the low-voltage event is over.

In some embodiments, a DC isolation contactor resides between the bidirectional inverter circuit and the brake resistor assembly.

In some embodiments, a static switch resides between the bidirectional inverter circuit and the brake resistor assembly, the static switch to electrically connect the bidirectional inverter circuit to the brake resistor assembly upon detection of the low-voltage event and disconnect the bidirectional inverter circuit to the brake resistor assembly upon loss of detection of the low-voltage event.

Some embodiments include detecting that the low-voltage event is over; and directing the electrical current generated by the electric generator to the power grid based on detecting that the low-voltage event is over.

Some embodiments include closing a circuit between an electrical output of the electric generator and the brake resistor assembly based on the detection of the low-voltage event.

Some embodiments include maintaining gas flow through the turbine wheel during the low-voltage event.

Some embodiments include converting electrical current generated by the electric generator into current having a frequency and amplitude compatible with the power grid.

Some embodiments include a speed-controlled, current regulated alternating current to direct current (AC/DC) rectifier electrically connected between the electric generator and the brake resistor assembly.

In some embodiments, the switching component comprises a static switch that activates upon detection of the low-voltage event and deactivates upon detection of completion of the low-voltage event.

BRIEF DESCRIPTION OF THE DRAWINGS

Like reference symbols in the various drawings indicate like elements. Drawings not to scale.

DETAILED DESCRIPTION

Natural gas, hydrogen, and other process gases are pressurized to facilitate efficient transportation in pipelines that are sometimes many miles long. The pipelines, for example, transport gasses from production sites (e.g., wells) to processing facilities and from processing facilities to local distribution networks, such as regional, city or district networks or on site industrial plants networks. To deliver the gas safely through local distribution networks and for use, the process gas is depressurized to lower levels (often using pressure regulators). The pressure is stepped down at pressure letdown (PLD) stations for delivery to industrial, commercial, and residential end users. The PLD stations use regulating valves to achieve the required pressure drop, but also waste significant amounts of energy in the process. Additional regulating valves can be used at other locations for pressure control, such as in the pipelines between the production and processing facilities, within the sub-processes of the processing facilities, and within the end user's processes and piping. A turboexpander generator can be installed in parallel to the regulating valve to recover the wasted energy from pressure reduction and produce electrical power. The electrical power can be directed to a power grid or elsewhere. Along the same lines, a turboexpander generator can be installed at a gas storage facility upstream of one or more storage tanks to recover high pressure gasses dispensed from a tanker truck, through the turboexpander generator, to the storage tanks. The turboexpander generator is relevant in other applications, such as in a hydrogen liquefaction process where gaseous hydrogen that has been cooled and pressurized is expanded to a liquid state. The expansion can be performed through a turboexpander generator to recover the wasted energy from the expansion and produce electrical power. As above, the electrical power can be directed to a power grid or elsewhere, such as used to power compressors or other components of the liquefaction process. In each instance, by recovering lost energy from natural gas and hydrogen pressure letdown applications, the turboexpander can generate electricity while also reducing $CO_2$ emissions, increasing overall plant efficiency, offsetting electrical costs, and generating additional revenue.

The power grid that the turboexpander can supply power to (and draw power from) can be a national or regional power grid, a local power grid for a city or district, or a small or microgrid, such as an on-site grid, e.g., at an industrial plant or neighborhood.

A fault condition at the power grid can result in a low-voltage event. The turboexpander 102 can include circuitry to facilitate the operation of the turboexpander 102 during the low-voltage event. The capability of the turboexpander 102 to operate during the low-voltage event can be referred to as low-voltage ride through (LVRT). LVRT includes the capability to remain connected and operational during a momentary or long-term low-voltage condition or outage of a power grid. One of the reasons for the low-voltage event can be a temporary loss of grid input. LVRT can also be referred to as fault ride through (FRT) or under-voltage ride through (UVRT). This disclosure describes a turboexpander system that includes electrical components that permit the turboexpander to remain operational during a low-voltage event while preventing the turboexpander from damage from over-speed of the rotor. Over-speed can result in shutdown of the turboexpander. Preventing over-speed of the rotor allows the turboexpander to avoid a shutdown and to supply power to the grid quickly after the low-voltage event, since the rotor can continue rotating. Power from the turboexpander can be routed to a brake resistor assembly or other power sink to compensate for the loss of the load at the grid.

An active front end (AFE) temporarily disconnects the turboexpander from the grid during a low-voltage event. To remain operational during the low-voltage event, the turboexpander electrical output is connected to a brake resistor assembly to prevent over-speeding and shutting down during low-voltage event. By continuing to rotate the rotor in the stator during the low-voltage event, the turboexpander can recouple to the network quickly after the low-voltage event is resolved with minimal down-time.

Figure 1:
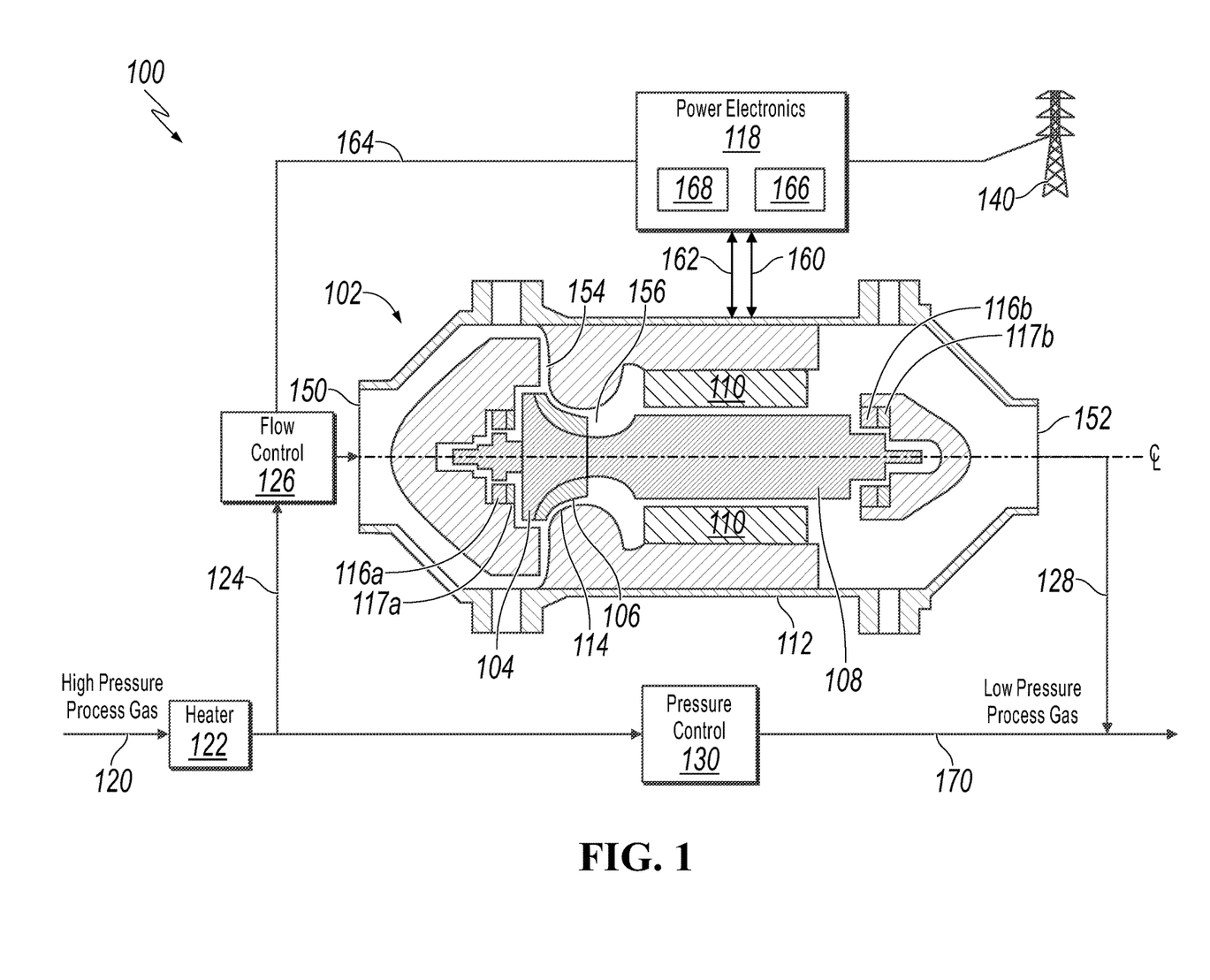
FIG. 1 is a schematic diagram of an electric power generation system coupled to a power grid in accordance with embodiments of the present disclosure.

FIG. 1 is a schematic diagram of an electric power generation system 100 coupled to a power grid 140 in accordance with embodiments of the present disclosure. The electric power generation system 100 can be added at a PLD station to capture energy from gas expansion from the PLD process, or in any of the other applications described above. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a gas through a turbine wheel 104. For example, rotation of the turbine wheel 104 can be used to rotate a rotor 108 within a stator 110, which then generates electrical energy.

FIG. 1 is a schematic diagram of an electric power generation system 100 coupled to a power grid 140 in accordance with embodiments of the present disclosure. The electric power generation system 100 can be added at a PLD station to capture energy from gas expansion from the PLD process. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a gas through a turbine wheel 104. For example, rotation of the turbine wheel 104 can be used to rotate a rotor 108 within a stator 110, which then generates electrical energy.

The turboexpander 102 includes a high-performance, high-speed permanent magnet generator with an integrated radial in-flow expansion turbine wheel 104 and low loss active magnetic bearings (AMBs) 116*a,b*. The rotor assembly consists of the permanent magnet section with the turbine wheel 104 mounted directly to the rotor hub. The rotor 108 is levitated by the magnetic bearing system creating a frictionless (or near frictionless) interface between dynamic and static components. The AMBs 116*a,b* facilitate a lossless (or near lossless) rotation of the rotor 108.

The turboexpander 102 includes a high-performance, high-speed permanent magnet generator with an integrated radial in-flow expansion turbine wheel 104 and low loss active magnetic bearings (AMBs) 116*a,b*. The rotor assembly consists of the permanent magnet section with the turbine wheel 104 mounted directly to the rotor hub. The rotor 108 is levitated by the magnetic bearing system creating a frictionless (or near frictionless) interface between dynamic and static components. The AMBs 116*a,b* facilitate a lossless (or near lossless) rotation of the rotor 108.

The turboexpander 102 is designed to have the process gas flow through the system, which cools the generator section and eliminates the need for auxiliary cooling equipment. The power electronics 118 for turboexpander combines a Variable Speed Drive (VSD) 166 and Magnetic Bearing Controller (MBC) 168 into one cabinet, in some implementations. The VSD allows for a consistent and clean delivery of generated power from the turboexpander 102 to a power grid 140. The VSD 166 regulates the frequency and amplitude of the generated current to match the local grid. After expansion, the gas exits the turboexpander 102 along the same axial path for downstream processes.

The turboexpander 102 includes a flow-through configuration. The flow-through configuration permits process gas to flow from an inlet side of the turboexpander 102 to an outlet side of the turboexpander 102. The gas flows into a radial gas inlet 154 to a turbine wheel 104 and a gas outlet 156 from the turbine wheel 104. The gas then flow through the generator and out of the outlet 156 where the gas rejoins the gas pipeline 170. Generally, high pressure process gas 120 is directed to flow into the turboexpander 102 through a flow control system 126. The flow control system 126 includes a flow or mass control valve and an emergency shut off valve. In embodiments, the turboexpander housing 112 is hermetically sealed.

The high pressure process gas 120 is expanded by flowing through the turbine wheel 104, resulting in a pressure letdown of the process gas. Lower pressure process gas 128 exits the turboexpander. The expansion of the high pressure process gas 120 through the turbine wheel 104 causes the turbine wheel 104 to rotate, which causes the rotor 108 to rotate. The rotation of the rotor 108 within the stator 110 generates electrical energy. The turboexpander 102 achieves the desired pressure letdown and captures the energy from the pressure letdown to generate electricity. A pressure control valve 130, such as a conventional pressure regulator, can be installed in parallel to the turboexpander 102. The pressure control valve 130 can be used to control the pressure of the high pressure process gas 120 that flows through the turboexpander. Any excess high pressure process gas that is not directed into the turboexpander can be directed through the pressure control valve 130.

In some embodiments, a heater 122 can heat the high pressure process gas 120 prior to flowing the gas into the turboexpander 102. For example, if the expansion of the gas through the turbine wheel 104 lowers the temperature of the process gas to a point where moisture in the gas freezes at the turbine wheel or other downstream locations in the pipeline, the pressurized process gas 120 can be heated by heater 122. Heated high pressure process gas 124 can then be directed into the turboexpander 102. The heating of the process gas can prevent freezing moisture as the gas expands and its temperature drops.

The turboexpander 102 includes a turbine wheel 104. The turbine wheel 104 is shown as a radial inflow turbine wheel, though other configurations are within the scope of this disclosure, such as axial flow turbine wheels. In this example, heated high pressure process gas 124 is received from an inlet conduit 150 of the housing 112 enters a radially oriented inlet 154 of the turbine wheel 104. In certain embodiments, the fluid flows through an inlet conduit 150 and is diverted by a flow diverter to a radial inlet 154 that directs the flow into the radial inflow of the turbine wheel 104. After expanding, the lower pressure process gas exits the turbine wheel 104 from an axially oriented outlet 156 to outlet conduit 152 of the housing 112.

The turbine wheel 104 can be directly affixed to the rotor 108, or to an intermediate common shaft, for example, by fasteners, rigid drive shaft, welding, or other manner. For example, the turbine wheel 104 may be received at an end of the rotor 108 and held to the rotor 108 with a shaft. The shaft threads into the rotor 108 at one end, and at the other, captures the turbine wheel 104 between the end of rotor 108 and a nut threadingly received on the shaft. The turbine wheel 104 and rotor 108 can be coupled without a gearbox and rotate at the same speed. In other instances, the turbine wheel 104 can be indirectly coupled to the rotor 108, for example, by a gear train, clutch mechanism, or other manner.

The turbine wheel 104 includes a plurality of turbine wheel blades 106 extending outwardly from a hub and that react with the expanding process gas to cause the turbine wheel 104 to rotate. FIG. 1 shows an unshrouded turbine wheel, in which each of the turbine blades 106 has an exposed, generally radially oriented blade tip extending between the radial inlet 154 and axial outlet 156. As discussed in more detail below, the blade tips substantially seal against a shroud 114 on the interior of the housing 112. In certain instances, the turbine wheel 104 is a shrouded turbine wheel.

In configurations with an un-shrouded turbine wheel 104, the housing 112 includes an inwardly oriented shroud 114 that resides closely adjacent to, and at most times during operation, out of contact with the turbine wheel blades 106. The close proximity of the turbine wheel blades 106 and shroud 114 substantially seals against passage of process gas therebetween, as the process gas flows through the turbine wheel 104. Although some amount of the process gas may leak or pass between the turbine wheel blades 106 and the shroud 114, the leakage is insubstantial in the operation of the turbine wheel 104. In certain instances, the leakage can be commensurate with other similar unshrouded-turbine/shroud-surface interfaces, using conventional tolerances between the turbine wheel blades 106 and the shroud 114. The amount of leakage that is considered acceptable leakage may be predetermined. The operational parameters of the turbine generator may be optimized to reduce the leakage. In embodiments, the housing 112 is hermetically sealed to prevent process gases from escaping the radial inlet 154 of the turbine wheel 104.

The shroud 114 may reside at a specified distance away from the turbine wheel blades 106, and is maintained at a distance away from the turbine wheel blades 106 during operation of the turboexpander 102 by using magnetic positioning devices, including active magnetic bearings and position sensors.

Bearings 116a and 116b are arranged to rotatably support the rotor 108 and turbine wheel 104 relative to the stator 110 and the shroud 114. The turbine wheel 104 is supported in a cantilevered manner by the bearings 116a and 116b. In embodiments, the turbine wheel 104 may be supported in a non-cantilevered manner and bearings 116a and 116b may be located on the outlet side of turbine wheel 104. In certain instances, one or more of the bearings 116a or 116b can include ball bearings, needle bearings, magnetic bearings, foil bearings, journal bearings, or others.

Bearings 116a and 116b may be a combination radial and thrust bearing, supporting the rotor 108 in radial and axial directions. Other configurations could be utilized. The bearings 116a and 116b need not be the same types of bearings.

In the embodiments in which the bearings 116a and 116b are magnetic bearings, a magnetic bearing controller (MBC) 168 is used to control the magnetic bearings 116a and 116b. Position sensors 117a, 117b can be used to detect the position or changes in the position of the turbine wheel 104 and/or rotor 108 relative to the housing 112, or other reference point (such as a predetermined value). Position sensors 117a, 117b can detect axial and/or radial displacement. The magnetic bearing 116a and/or 116b can respond to the information from the positions sensors 117a, 117b and adjust for the detected displacement, if necessary. The MBC 168 may receive information from the position sensor(s) 117a, 117b and process that information to provide control signals to the magnetic bearings 116a, 116b. MBC 168 can communicate with the various components of the turboexpander 102 across a communications channel 162.

The use of magnetic bearings 116a, 116b and position sensors 117a, 117b to maintain and/or adjust the position of the turbine wheel blades 106 such that the turbine wheel blades 106 stay in close proximity to the shroud 114 permits the turboexpander 102 to operate without the need for seals (e.g., without the need for dynamic seals). The use of the active magnetic bearings 116a,b in the turboexpander 102 eliminates physical contact between rotating and stationary components, as well as eliminate lubrication, lubrication systems, and seals.

The turboexpander 102 may include one or more backup bearings. For example, at start-up and shut-down or in the event of a power outage that affects the operation of the magnetic bearings 116a and 116b, bearings may be used to rotatably support the turbine wheel 104 during that period of time. The backup bearings may include ball bearings, needle bearings, journal bearings, or the like.

As mentioned previously, the turboexpander 102 is configured to generate electricity in response to the rotation of the rotor 108. In certain instances, the rotor 108 can include one or more permanent magnets. The stator 110 includes a plurality of conductive coils. Electrical current is generated by the rotation of the magnet within the coils of the stator 110. The rotor 108 and stator 110 can be configured as a synchronous, permanent magnet, multiphase alternating current (AC) generator. The electrical interface 160 can be a three-phase output, for example. In certain instances, stator 110 may include a plurality of coils (e.g., three or six coils for a three-phase AC output). When the rotor 108 is rotated, a voltage is induced in the stator coil. At any instant, the magnitude of the voltage induced in coils is proportional to the rate at which the magnetic field encircled by the coil is changing with time (i.e., the rate at which the magnetic field is passing the two sides of the coil). In instances where the rotor 108 is coupled to rotate at the same speed as the turbine wheel 104, the turboexpander 102 is configured to generate electricity at that speed. Such a turboexpander 102 is what is referred to as a "high speed" turbine generator. For example, in embodiments, the turboexpander 102 can produce up to 280 kW at a continuous speed of 30,000 rpm. In embodiments, the turboexpander can produce on the order of 350 kW at higher rotational speeds (e.g., on the order of 35,000 rpm).

Electrical interface 160 can be bidirectional to receive power from the grid or elsewhere into the turboexpander 102. For example, power from the grid 140 or elsewhere can be received at electrical interface 160 to power-up the turboexpander rotor or other electrical components.

In some embodiments, the design of the turbine wheel 104, rotor 108, and/or stator 110 can be based on a desired parameter of the output gas from the turboexpander 102. For example, the design of the rotor and stator can be based on a desired temperature of the gas 128.

The turboexpander 102 can be coupled to a power electronics 118. Power electronics 118 can include a variable speed drive (VSD) 166 (or variable frequency drive) and the magnetic bearing controller (MBC) 168 (discussed above).

The electrical interface 160 of the turboexpander 102 is connected to the VSD 166, which can be programmed to specific power requirements. The VSD 166 can include an insulated-gate bipolar transistor (IGBT) bidirectional inverter 204 to convert the variable frequency, high voltage output from the turboexpander 102 to a direct current (DC). The bi directional inverter 204 can be a three-phase rectifier for three-phase AC input current. An Active Front End rectifier (AFE) 206 then converts the DC from the rectified AC from 204 for supplying to the power to grid 140. The AFE 206 can convert the DC to 380 VAC-480 VAC current at 50 to 60 Hz for delivery to the power grid. The specific output of the VSD 166 depends on the power grid and application. Other conversion values are within the scope of this disclosure. The VSD 166 matches its output to the power grid 140 by sampling the grid voltage and frequency, and then changing the output voltage and frequency of the AFE 206 to match the sampled power grid voltage and frequency.

The turboexpander 102 is also connected to the MBC 168 in the power electronics 118. The MBC 168 constantly monitors position, current, temperature, and other parameters to ensure that the turboexpander 102 and the active magnetic bearings 116a and 116b are operating as desired. For example, the MBC 168 is coupled to position sensors 117a, 117b to monitor radial and axial position of the turbine wheel 104 and the rotor 108. The MBC 168 can control the magnetic bearings 116a, 116b to selectively change the stiffness and damping characteristics of the magnetic bearings 116a, 116b as a function of spin speed. The MBC 168 can also control synchronous cancellation, including automatic balancing control, adaptive vibration control, adaptive vibration rejection, and unbalance force rejection control.

Figure 2:
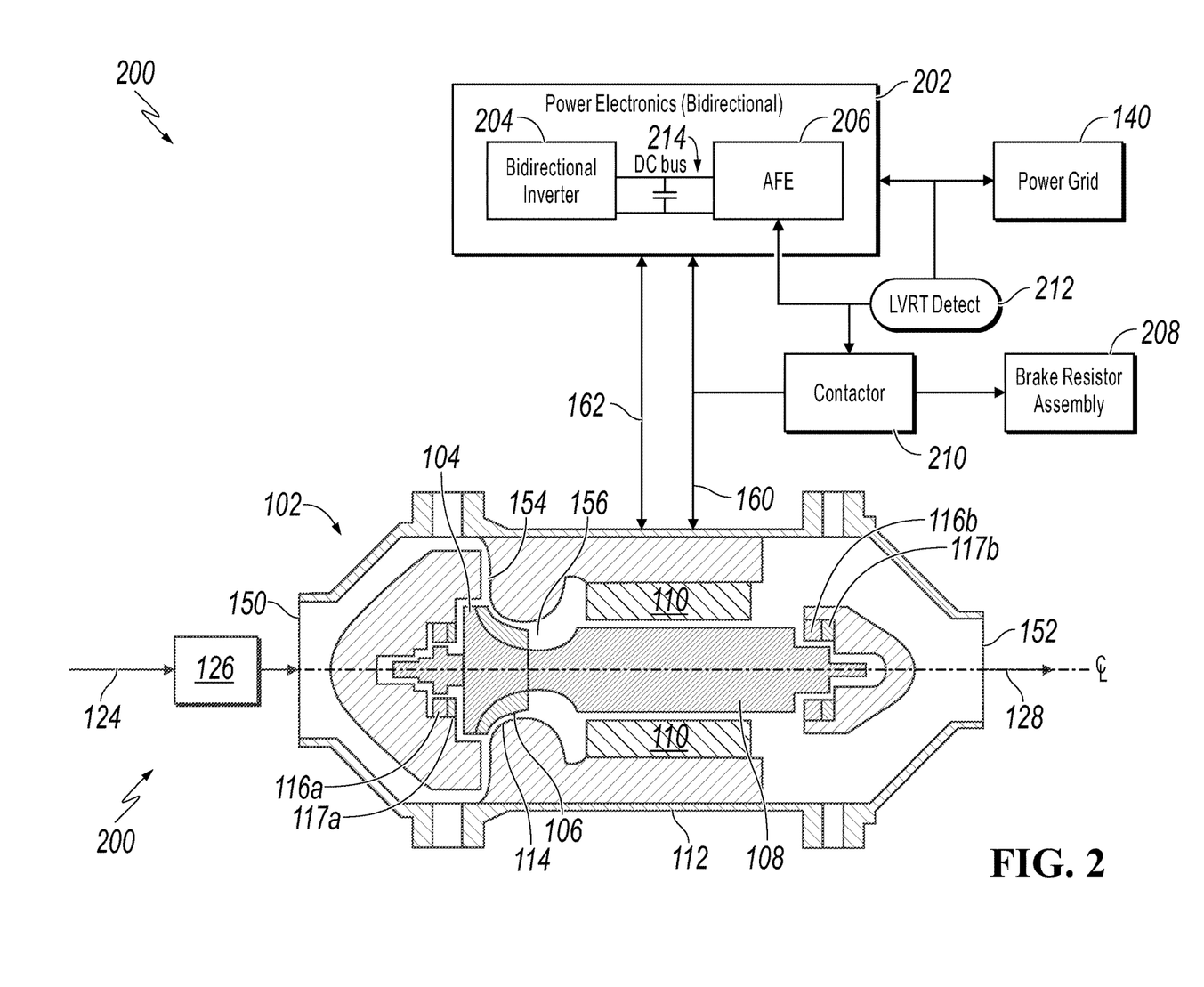
FIG. 2 is a schematic diagram of an example turboexpander system that includes low voltage ride through control architecture in accordance with embodiments of the present disclosure.

A low-voltage event at the power grid 140 can occur due, for example, to a fault condition or other problem at the grid. If the turboexpander process gas flow loop (e.g., through flow control system 126) is not terminated immediately, the rotor can over-speed to a destructive level. A process gas flow loop that is controlled by mechanical valve system (flow control system 126) has several seconds of latency. Based on rotor inertia, the speed of the rotor could accelerate to several thousand RPM in less than a second. FIG. 2 illustrates an example turboexpander system 200 that can provide ride-through during a low-voltage event, where the turboexpander rotor can continue to rotate within a range of operational speeds without over-speed or shutting down.

FIG. 2 is a schematic diagram of an example turboexpander system 200 that includes low voltage ride through control architecture in accordance with embodiments of the present disclosure. The turboexpander system 200 includes a turboexpander 102 that can generate electrical power by capturing energy lost during pressure letdown sequences, as described above. During operation, the power generated by the turboexpander 102 is directed to the power grid 140. For example, a bidirectional power electronics 202 can include a bidirectional inverter 204 and active front end (AFE) rectifier 206. The bidirectional power electronics 202 can direct power to the power grid 140 and/or to critical loads. Bidirectional power electronics 202 can also supply power from the power grid 140 to the turboexpander 102 for start-up purposes, to power certain components, or other reasons. Bidirectional power electronics 202 can include the same or similar components as power electronics 118 described above.

The electrical interface 160 can be electrically connected to the bidirectional inverter 204. Alternating current from the turboexpander 102 can be directed to the bidirectional inverter 204 using electrical interface 160. The bidirectional inverter 204 can convert the alternating current to direct current for traversal on DC bus 214. Active front end 206, which can include one or more rectifiers, can convert the direct current on the DC bus 214 into alternating current having a frequency and amplitude conforming to the power grid or other electrical loads. The AFE 206 can output power to the power grid 140 or other electrical loads.

The AFE 206 can also receive AC from the power grid 140 and convert the AC to DC for traversal on the DC bus 214. The DC can be converted to AC by bidirectional inverter 204 for powering up the turboexpander 102.

The turboexpander system 200 can include LVRT detection circuitry 212 that can detect a low-voltage event. The LVRT detection circuitry 212 can cause the AFE rectifier 206 to disconnect from the power grid 140 upon detection of a low-voltage event. Turning off or disconnecting the AFE rectifier 206 can result in interrupted power flow from the turboexpander 102 to the power grid 140. The LVRT detection circuitry 212 can also cause the contactor 210 to close, thereby directing power from the turboexpander 102 to the brake resistor assembly 208. In embodiments, LVRT detection circuitry 212 can include pulse width modulation circuitry to regulate DC bus voltage.

Turboexpander system 200 includes a brake resistor assembly 208 connected across the terminals of turboexpander electrical interface 160. The brake resistor assembly 208 is designed for a three-phase AC output from the turboexpander 102. The brake resistor assembly 208 can include a resistor in series with each phase of the turboexpander electrical interface 160. In some embodiments, the brake resistor assembly 208 can include a capacitor in series with each resistor, either on the up-current or down-current side of the resistor. Temporarily connecting the brake resistor assembly during the low-voltage event will provide alternate path for turboexpander generated power to flow, which maintains the loading on the turboexpander. This loading eliminates the over-speed condition during the low-voltage event.

The brake resistor assembly 208 can include a short-term peak kilowatt rated brake resistor. The peak rating of the brake resistor is determined by the maximum kilowatt rating of the turboexpander electrical output. The brake resistor assembly 208 can be connected temporarily during low-voltage event detection. For example, a contactor 210 or other switch circuitry or switching component can be controlled (e.g., based on input from LVRT detection circuitry 212) to connect the brake resistor assembly 208 to the electrical interface 160 of turboexpander 102 upon detection of a low-voltage event trigger. Switching the electrical interface 160 of turboexpander 102 to the brake resistor assembly 208 disconnects the electrical interface 160 from the power electronics 202. When the low-voltage event is resolved, the LVRT detection circuitry 212 can cause the contactor 210 can disconnect the brake resistor assembly 208 from the electrical interface 160 of the turboexpander 102. The electrical interface 160 would then direct power from the turboexpander to the power electronics 118. In embodiments, contactor 210 can be a contactor or other type of switch that can handling power ratings and activate and deactivate based on the presence or absence of an input or trigger. The contactor 210 can include an AC isolation contactor, which can facilitate maintenance of the brake resistor assembly without disrupting the turboexpander operation.

The LVRT detection circuitry 212 can include circuitry to measure the voltage or current output to the grid to detect a low-voltage event. The LVRT detection circuitry 212 can also include circuitry or other logic to control the AFE 206 and the contactor 210 during the low-voltage event to direct current from the electrical interface 160 to the brake resistor assembly 208. For example, the LVRT detection circuitry 212 can include circuitry or other logic to turn off or disconnect the AFE 206 during the low-voltage event, and to turn on or reconnect the AFE 206 after the low-voltage event has resolved. The LVRT detection circuitry 212 can include circuitry or other logic to close contactor 210 to couple the electrical interface 160 with the brake resistor assembly 208 during the low-voltage event.

Figure 3:
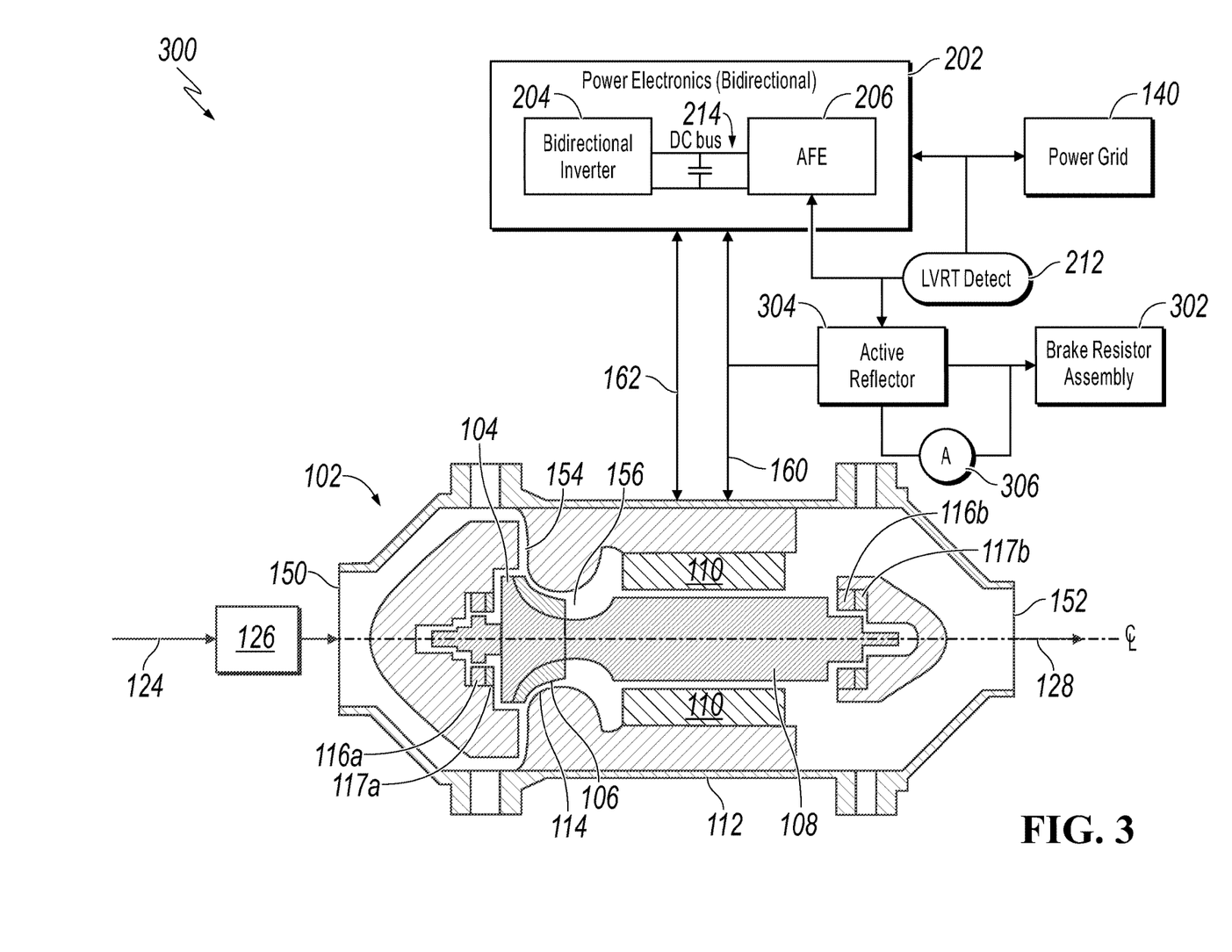
FIG. 3 is a schematic diagram of another example turboexpander system that includes low voltage ride through control architecture in accordance with embodiments of the present disclosure.

FIG. 3 is a schematic diagram of another example turboexpander system 300 that includes low voltage ride through control architecture in accordance with embodiments of the present disclosure. The turboexpander system 300 includes a brake resistor assembly 302. Brake resistor assembly 302 can include a brake resistor in series with each phase of the turboexpander electrical interface 160. In some embodiments, the brake resistor assembly 302 can include a capacitor in series with each resistor, either on the up-current or down-current side of the resistor. The resistors of the brake resistor assembly 302 can be continuous rated resistor that can be loaded with power continuously for a certain amount of time. Thus, the resistors can be selected based on the maximum expected power output from the turboexpander during the low-voltage event.

The brake resistor assembly 302 can be temporarily connected to the electrical interface 160 of the turboexpander 102 when the low-voltage event is detected. A speed-controlled, current regulated AC/DC active rectifier 304 (active rectifier 304 for short) can be coupled between the electrical interface 160 and the brake resistor assembly 302. LVRT detection circuitry can monitor the voltage at the power grid to determine the presence or absence of a low-voltage event. The LVRT detection circuitry 212 can control the AFE 206 and the active rectifier 304 to direct current from the turboexpander 102 to the brake resistor assembly 302 during a low-voltage event.

The active rectifier 304 can be activated by the LVRT detection circuitry 212 when a low-voltage event is detected. The active rectifier 304 can be deactivated by the LVRT detection circuitry 212 when the low-voltage event is over (and when operations return to normal). The active rectifier 304 can use a current monitor 306 to monitor current into the brake resistor assembly 302. In embodiments, the active rectifier 304 is a fully-rated AC/DC converter that can handle the power output from the turboexpander 102. This architecture allows the turboexpander 102 to maintain its operating speed during the low-voltage event, which has the added benefit that the architecture reduces the likelihood of restart lag and power draw associated with restart. Also, the process gas flow pressure letdown sequence does not need to be interrupted, which allows the process gas to be directed to its next destination.

The use of a speed-controlled, current regulated AC/DC active rectifier 304 as shown in FIG. 3 mitigate the effects of turboexpander 102 and connected cable inductance on the power draw of the brake resistor assembly 302. The brake resistor assembly 302, therefore, does not need to be co-located with the turboexpander 102. Also, the use of a speed-controlled, current regulated AC/DC active rectifier 304 provides tolerance in the design of brake resistor assembly to accommodate for various turboexpander speeds and power outputs. The brake resistor assembly 302 can also be a DC circuit, which reduces cost and complexity of the design of the brake resistor assembly 302.

The LVRT detection circuitry 212 can turn on or reconnect the AFE 206 after the low-voltage event is resolved.

Figure 4:
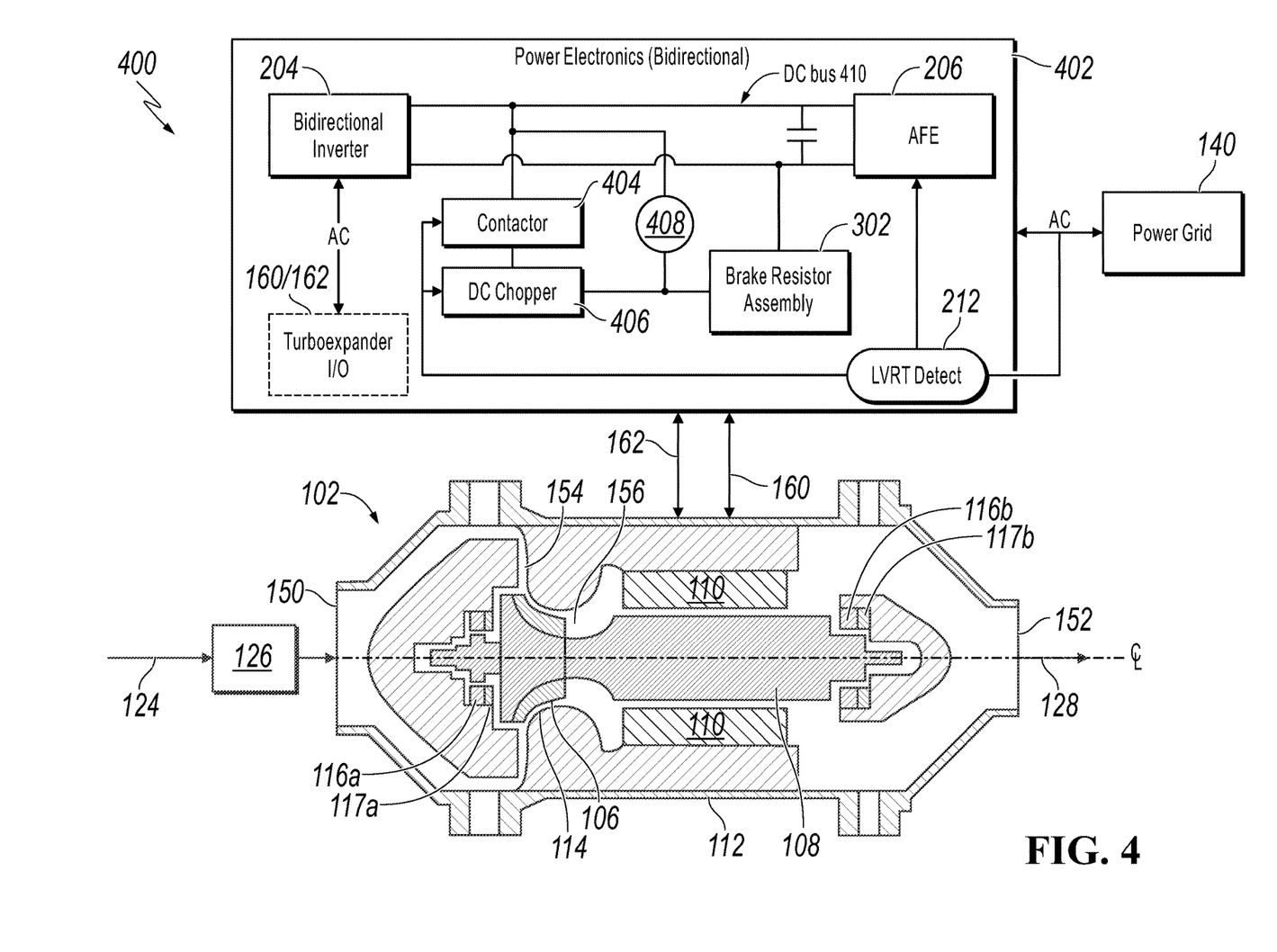
FIG. 4 is a schematic diagram of another example turboexpander system that includes low voltage ride through control architecture in accordance with embodiments of the present disclosure.

FIG. 4 is a schematic diagram of another example turboexpander system 400 that includes low voltage ride through control architecture in accordance with embodiments of the present disclosure. The architecture of brake resistor assembly 302 of turboexpander system 400 is similar to that shown in FIG. 3. In this embodiment, the architecture of brake resistor assembly 302 is connected across the DC bus 410 of the power electronics 402. Power electronics 402 is similar to power electronics 118 and power electronics 202 described above, in that power electronics 402 includes a bidirectional inverter 204 that can convert the AC from the electrical interface 160 from turboexpander 102 into DC and direct the DC to an AFE 206. AFE 206 can convert the DC into AC having a frequency and amplitude compatible with the power grid 140. The AFE 206 can also receive current from the power grid 140, convert the current into DC. The bidirectional inverter 204 can convert the DC into AC having a frequency and amplitude for starting up the rotation of the rotor in the stator for turboexpander start-up operations.

In the example embodiment of FIG. 4, the bidirectional inverter 204 can direct current flow from the turboexpander 102 to the brake resistor assembly 302. The brake resistor assembly 302 is connected across the DC bus 410 with a contactor 404 and DC chopper 406. The DC chopper 406 can use a current monitor 408 to monitor current into the brake resistor assembly 302. The DC chopper 406 and current sensor 408 feedback facilitates precharge control current flow in the case a low-voltage event causes a rush of current flow from the turboexpander from over speed. The embodiment shown in FIG. 4 can use the existing bidirectional inverter 204 to direct current from the turboexpander 102 to the brake resistor assembly 302, which can save on space, costs, and complexity. The bidirectional inverter 204 can include a speed-controlled, current regulated AC/DC active rectifier, similar to that described in FIG. 3.

The brake resistor assembly 302 can be isolated from the circuit by a contactor 404. Contactor 404 can be a static switch that be controlled by a signal indicating the low-voltage event (e.g., from LVRT detection circuitry 212). The contactor 404 can disconnect the brake resistor assembly 302 when the low-voltage event is over. The circuit can include a precharge feature to facilitate current rush as well as increasing DC chopper 406 switching speed. The DC chopper 406 can also receive a signal from the LVRT detection circuitry 212 to operate the DC chopper 406. In some embodiments, a DC isolation contactor 404 can be included to isolate the brake resistor assembly 302 for maintenance without disrupting turboexpander operation.

Turboexpander system 400 also includes LVRT detection circuitry 212. LVRT detection circuitry can monitor voltage at the power grid 140 to detect the presence or absence of a low-voltage event. Upon detecting a low-voltage event, the LVRT detection circuitry 212 can cause the contactor 404 to close and the AFE 206 to turn off or disconnect from the DC bus 410, which causes current from the turboexpander 102 to flow into the brake resistor assembly 302. Upon detection that the low-voltage event is over, the LVRT detection circuitry can open the contactor 404 and turn on or reconnect AFE 206 to the DC bus 410, which causes current to flow to the AFE 206, and restored power delivered to the power grid 140.

In some embodiments, a heat sink can be used instead of or in addition to a brake resistor assembly to dissipate power from the turboexpander to prevent over speed of the rotor during a fault condition.

Figure 5:
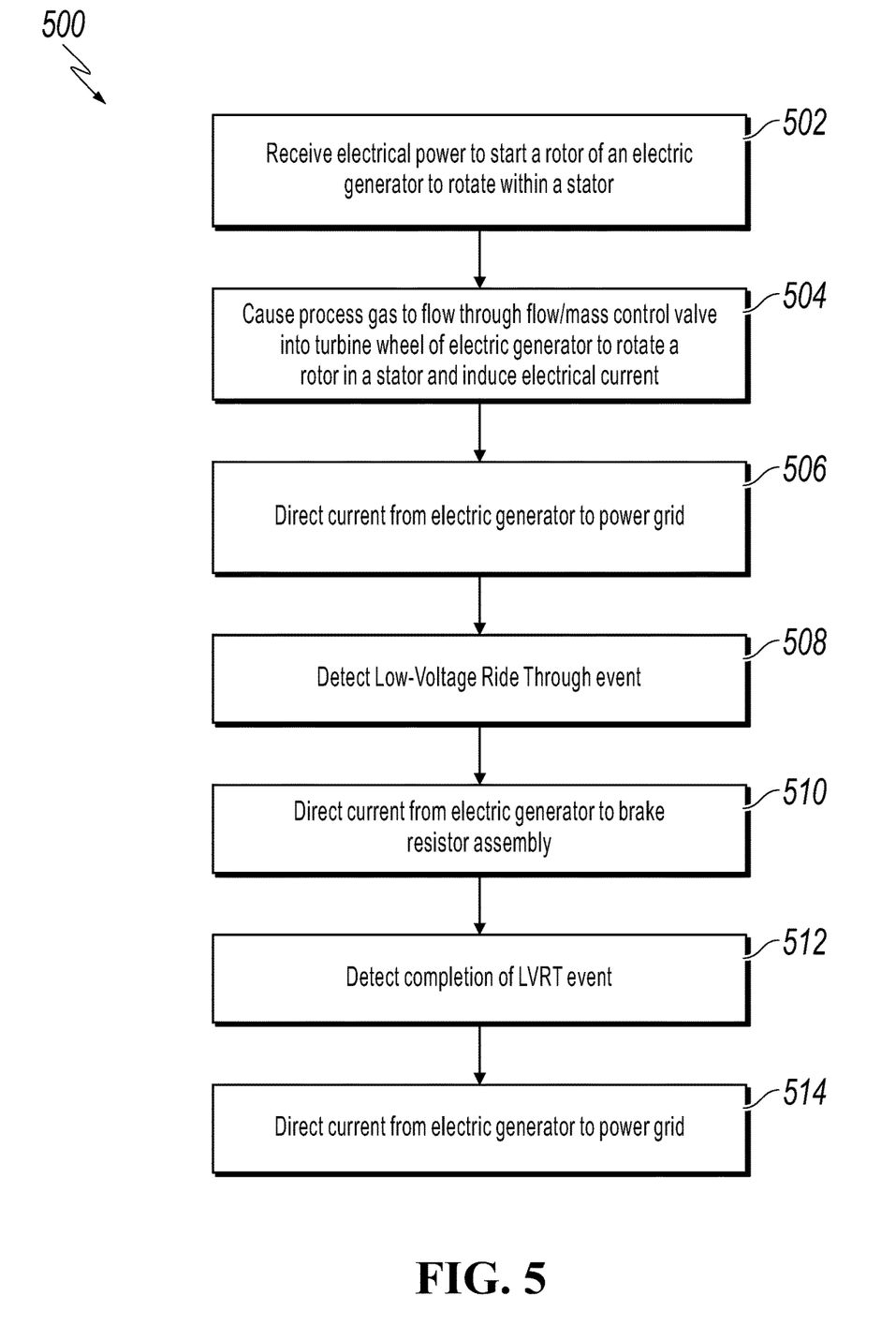
FIG. 5 is a process flow diagram for operating a turboexpander electric generator during a low-voltage ride through event in accordance with embodiments of the present disclosure.

FIG. 5 is a process flow diagram for operating a turboexpander electric generator during a low-voltage ride through event in accordance with embodiments of the present disclosure. In some embodiments, power is received at a turboexpander operating as an electric generator to start the rotation of a rotor within a stator. (502). In some embodiments, a process gas is flowed through a turbine wheel of the turboexpander as part of a pressure letdown sequence. The energy of the gas flow is used to rotate the turbine wheel, which is coupled to a rotor. Rotation of the turbine wheel causes the rotor to rotate within the stator, which generates electrical current. (504).

The electrical current from the turboexpander is directed to a power grid. (506). The electrical current from the turboexpander is alternating current (AC). The AC from the turboexpander is converted to direct current (DC) by power electronics. The DC is then converted into AC that has a frequency and amplitude that is compatible with a power grid. The compatible AC is directed to the power grid. (506).

In some circumstances, a fault condition can cause a low-voltage event. For example, a power grid failure or loss of input current to the power grid can cause the low-voltage event. The low-voltage event can be determined by the grid voltage as detected by LVRT detection circuitry falling below the LVRT threshold value. (508). Upon detection of the low-voltage event, current from the turboexpander can be redirected to a brake resistor assembly. (510). In embodiments, the AC from the turboexpander can be converted to DC by a rectifier and directed into the brake resistor assembly.

The completion of the low-voltage event can be detected. (512). Completion of the low-voltage event can be determined by the grid voltage detected by the LVRT detection circuitry being greater than or equal to the LVRT threshold voltage. Upon detection of the completion of the low-voltage event, the LVRT detection circuitry can cause the AC from the turboexpander can be redirected back into the power grid through the power electronics. (514).

Figure 6:
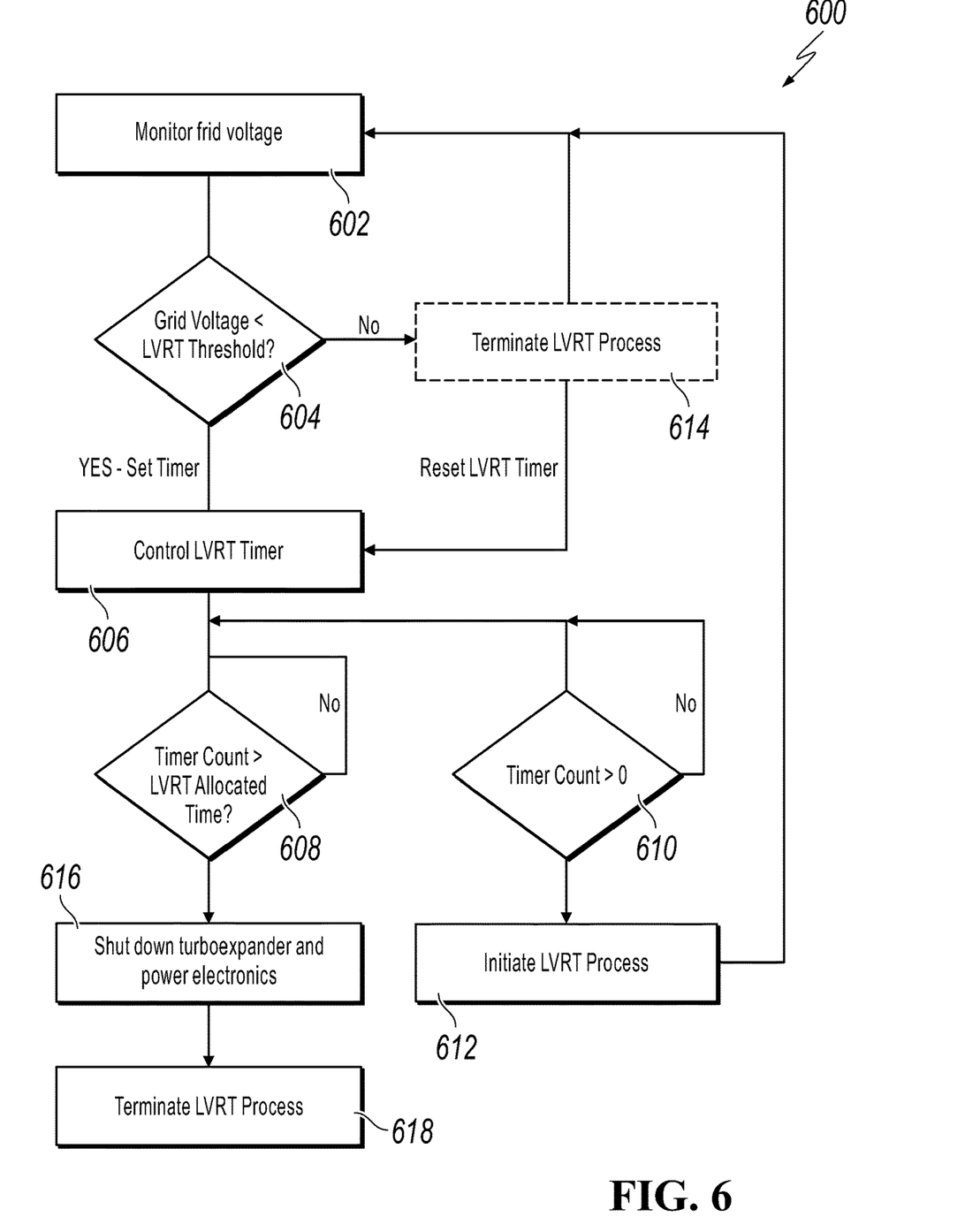
FIG. 6 is a process flow diagram for initiating a low-voltage ride through procedure in accordance with embodiments of the present disclosure.

FIG. 6 is a process flow diagram 600 for initiating a low-voltage ride through procedure in accordance with embodiments of the present disclosure. Throughout the operation of the turboexpander, at certain intervals, or on demand, the grid voltage can be monitored. (602). Grid voltage is monitored constantly to ensure that low-voltage events are detected and to make sure that when low-voltage events are resolved, the turboexpander can resume supplying power to the power grid. Grid voltage can be monitored using LVRT detection circuitry.

If the grid voltage is less than an LVRT threshold voltage (604), an LVRT timer can be started (606). The LVRT threshold voltage is implementation-specific. In some embodiments, LVRT threshold voltage can be based, at least in part, on the power output characteristics of the turboexpander. The LVRT timer can be initialized to zero, and begin a count [Timer Count]. The Timer Count can provide a maximum amount of time for the LVRT before the turboexpander, the power electronics, and other components should be shut down. This maximum amount of time can be implementation specific, and is referred to herein as LVRT allocated time. If the Timer Count is less than the LVRT allocated time 608 and the timer count is greater than zero 610, the LVRT process can be initiated (612). The LVRT process can include disconnecting or deactivating the AFE and connecting the turboexpander electrical interface to the brake resistor assembly, thereby directing current from the turboexpander to the brake resistor assembly.

If the Timer Count is greater than or equal to the LVRT allocated time (608), then the turboexpander and power electronics can be shut down (616). If an LVRT process has begun, then the LVRT process would also be terminated when the turboexpander and power electronics shutdown occurs (618).

If the grid voltage is greater than or equal to the LVRT threshold voltage, 604, and an LVRT process has not already started, then the LVRT detection circuitry can continue monitoring the grid voltage (602).

If, however, an LVRT process has begun, when the grid voltage returns to a value above the LVRT threshold voltage, 604, the LVRT detection circuitry can cause the LVRT process to terminate (614). The timer can be reset to zero (606). The LVRT process is terminated only if the grid voltage is greater than or equal to the LVRT threshold and the Timer Count is less than or equal to the LVRT allocated time. If the Timer Count exceeds the LVRT allocated time, then the turboexpander and power electronics are shut down, and the LVRT process would have terminated (618).

The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment. In the foregoing specification, a detailed description has been given with reference to specific exemplary embodiments. It will, however, be evident that various modifications and changes may be made thereto without departing from the broader spirit and scope of the disclosure as set forth in the claims.

What is claimed is:

1. An apparatus comprising:
an electric generator comprising:
a turbine wheel configured to receive process gas and rotate in response to expansion of the process gas flowing into an inlet of the turbine wheel and out of an outlet of the turbine wheel,
a rotor coupled to the turbine wheel and configured to rotate with the turbine wheel, and
a stationary stator, the electric generator to generate an alternating current upon rotation of the rotor within the stator;
a brake resistor assembly comprising a brake resistor;
a switching component to cause current originating from the electric generator to flow into the brake resistor assembly based on a detection of a low-voltage event;
a bidirectional inverter comprising a speed-controlled, current regulated alternating current to direct current (AC/DC) rectifier, the speed-controlled, current regulated AC/DC rectifier to direct current from an electrical output of the turboexpander to the brake resistor assembly through a DC bus upon detection of the low-voltage event and to electrically isolate the brake resistor assembly when the low-voltage event is complete; and
a low-voltage detection circuit to detect voltage and control the switching component based on a detection of a low-voltage event.

2. The apparatus of claim 1, wherein the switching component comprises a static switch to connect the brake resistor assembly to an electrical output of the electric generator upon detection of the low-voltage event and to disconnect the brake resistor assembly from the electrical output of the electric generator upon detection of a completion of the low-voltage event.

3. The apparatus of claim 2, wherein the brake resistor comprises a peak kilowatt rated resistor.

4. The apparatus of claim 1, wherein the brake resistor assembly is co-located with the electric generator.

5. The apparatus of claim 1, wherein the brake resistor comprises a continuous-rated brake resistor.

6. The apparatus of claim 1, wherein the switching component comprises an AC isolation contactor to electrically isolate the brake resistor assembly from the electrical output of the electric generator.

7. The apparatus of claim 1, comprising a power electronics, the power electronics comprising:
the bidirectional inverter; and
an active front end (AFE) rectifier to receive DC on the DC bus from the bidirectional inverter circuit and to convert the DC into AC having a frequency and amplitude compatible with a power grid.

8. The apparatus of claim 7, wherein the power electronics comprises the switching component and the brake resistor assembly, the switching component connected to an output of the bidirectional inverter circuit on the DC bus.

9. The apparatus of claim 8, further comprising a DC isolation contactor between the bidirectional inverter circuit and the brake resistor assembly.

10. The apparatus of claim 8, further comprising a static switch between the bidirectional inverter circuit and the brake resistor assembly, the static switch to electrically connect the bidirectional inverter circuit to the brake resistor assembly upon detection of the low-voltage event and disconnect the bidirectional inverter circuit to the brake resistor assembly upon loss of detection of the low-voltage event.

11. A system comprising:
an electric generator comprising:
a turbine wheel configured to receive process gas and rotate in response to expansion of the process gas flowing into an inlet of the turbine wheel and out of the outlet of the turbine wheel,
a rotor coupled to the turbine wheel and configured to rotate with the turbine wheel, and
a stationary stator, the electric generator to generate an alternating current upon rotation of the rotor within the stator;
a brake resistor assembly comprising a brake resistor;
a switching component to cause current originating from the electric generator to flow into the brake resistor assembly based on a detection of a low-voltage event;
a bidirectional inverter comprising a speed-controlled, current regulated alternating current to direct current (AC/DC) rectifier, the speed-controlled, current regulated AC/DC rectifier to direct current from an electrical output of the turboexpander to the brake resistor assembly through a DC bus upon detection of the low-voltage event and to electrically isolate the brake resistor assembly when the low-voltage event is complete;
a low-voltage detection circuit to detect voltage and control the switching component based on a detection of a low-voltage event;
a bidirectional inverter circuit to receive alternating current (AC) from the electric generator and convert the AC to direct current (DC); and
an active front end (AFE) rectifier to receive DC from the bidirectional inverter circuit and to convert the DC into AC having a frequency and amplitude compatible with a power grid.

12. The system of claim 11, wherein the switching component comprises a static switch that activates upon detection of the low-voltage event and deactivates upon detection of completion of the low-voltage event.

13. A method comprising:
causing gas to flow through a turbine wheel of an electric generator residing downstream of a flow control valve;
generating alternating current by the electric generator based on rotation of the turbine wheel by the gas flow;
directing alternating current generated by the electric generator to a bidirectional inverter circuit to receive alternating current from the electric generator and convert the AC to direct current;
detecting, by a low-voltage detection circuit, a low-voltage event at the power grid; and
directing, by a switching component, electrical current generated by the electric generator to a brake resistor assembly based on the detection of the low-voltage event, the bidirectional inverter comprising a speed-controlled, current regulated alternating current to direct current (AC/DC) rectifier, the speed-controlled, current regulated AC/DC rectifier to direct current from an electrical output of the turboexpander to the brake resistor assembly through a DC bus upon detection of the low-voltage event and to electrically isolate the brake resistor assembly when the low-voltage event is complete.

14. The method of claim 13, comprising:
detecting, by the low-voltage detection circuit, that the low-voltage event is over; and
directing, by the switching component, the electrical current generated by the electric generator to the power grid based on detecting that the low-voltage event is over.

15. The method of claim 14, comprising converting electrical current generated by the electric generator into current having a frequency and amplitude compatible with the power grid.

16. The method of claim 13, comprising closing a circuit between an electrical output of the electric generator and the brake resistor assembly based on the detection of the low-voltage event.

17. The method of claim 13, comprising maintaining gas flow through the turbine wheel during the low-voltage event.

* * * * *